United States Patent [19]

Schroeder

[11] Patent Number: 4,772,294

[45] Date of Patent: Sep. 20, 1988

[54] BRAZED COMPOSITE COMPACT IMPLEMENTS

[75] Inventor: Robert R. Schroeder, Worthington, Ohio

[73] Assignee: The General Electric Company, Worthington, Ohio

[21] Appl. No.: 127,559

[22] Filed: Dec. 2, 1987

Related U.S. Application Data

[63] Continuation of Ser. No. 752,419, Jul. 5, 1985, abandoned.

[51] Int. Cl.$^4$ .............................................. B24D 3/02
[52] U.S. Cl. ........................................ 51/309; 51/293
[58] Field of Search .................................... 51/293, 309

[56] References Cited

U.S. PATENT DOCUMENTS 4,149,881 4/1979 D'Silva .................................. 75/134
4,225,322 9/1980 Knemeyer ............................. 51/309
4,527,998 7/1985 Knemeyer ............................. 51/309

Primary Examiner—Paul Lieberman
Assistant Examiner—Willie J. Thompson
Attorney, Agent, or Firm—Mueller and Smith

[57] ABSTRACT

Disclosed is an improved implement comprising a cemented carbide supported composite abrasive compact which is brazed to a cemented carbide substrate with a brazing filler metal having a liquidus substantially above 700° C. The composite compact preferably is a composite polycrystalline diamond compact. The brazing filler metal is a brazing alloy which has the following composition, by weight:

Pd: 20–80%
Cr: 2–13%
B: 1–4%
Ni: balance.

14 Claims, 2 Drawing Sheets

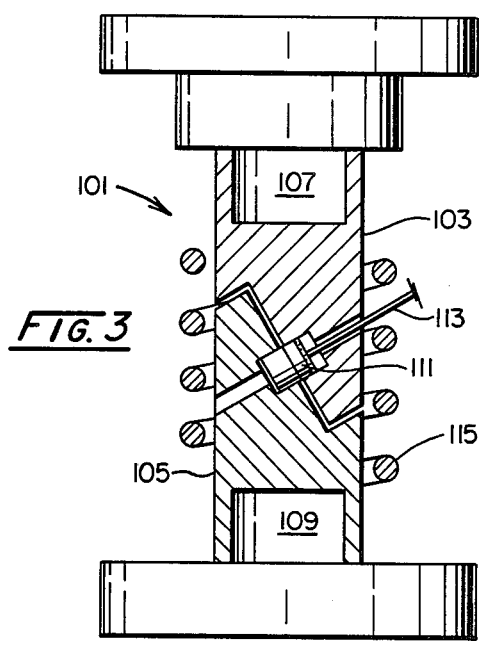

BRAZED COMPOSITE COMPACT IMPLEMENTS

This application is a continuation of application Ser. No. 752,419, filed July 5, 1985, now abandoned.

CROSS-REFERENCE TO RELATED APPLICATIONS

This application is related to commonly-assigned application Ser. No. 06/624,064, filed June 25, 1984, now U.S. Pat. No. 4,527,998, the disclosure of which is incorporated expressly herein by reference.

TECHNICAL FIELD

This invention relates to implements incorporating abrasive particle compacts and more particularly to drilling and cutting implements having such compacts mounted thereon and to methods for fabricating the same. Such abrasive particle compact implements have found special utility in drill bits for oil and gas exploration and in mining applications.

BACKGROUND ART

An abrasive particle compact is a polycrystalline mass of abrasive particles such as diamond and/or cubic boron nitride bonded together to form an integral, tough, high-strength mass. Such components can be bonded together in particle-to-particle self-bonded relationship, by means of a bonding medium disposed between the particles, or by combinations thereof. For examples, see U.S. Pat. Nos. 3,136,615; 3,141,746; and 3,233,988. A supported abrasive particle compact herein termed a composite compact, is an abrasive particle compact which is bonded to a substrate material, such as cemented tungsten carbide. Compacts of this type are described, for example, in U.S. Pat. Nos. 3,743,489, 3,745,623, and 3,767,371. The bond to the support can be formed either during or subsequent to the formation of the abrasive particle compact.

Composite compacts have found special utility as cutting elements in drill bits. These compacts can be attached directly to the drill crown of drill bits by a variety of techniques. U.S. Pat. No. 4,156,329 proposes to furnace braze a pretinned metal-coated compact to recesses formed in the crown. U.S. Pat. No. 4,186,628 proposes to attach the compact cutters to the crown by placing the compacts in a mold, filling the crown portion of the mold with powder, and running a low temperature infiltration braze into the mold to form the crown containing the compacts embedded therein. U.S. Pat. No. 4,098,362 proposes drill bits in the manner of the latter proposal wherein the cutter are placed at a rank angle of between $-10°$ and $-25°$.

Alternatively, composite compacts can be affixed to an elongated stud or substrate which stud then is attached to the drill crown. The stud provides greater attachment area to the drill crown. It also provides more support for the abrasive particle compact thereby increasing its impact resistance. Composite compacts have been attached to studs in both a right cylinder configuration as depicted in U.S. Pat. No. 4,200,159, and in an angled configuration, as shown, for example, in U.S. Pat. No. 4,265,324.

Although the benefits of attaching a composite compact to a stud or substrate are apparent, problems have been encountered in achieving the actual attachment. In particular, it has been noted that composite compacts in which the abrasive portion is self-bonded and metal infiltrated such as described in U.S. Pat. No. 3,745,623 and available commercially under the trademarks Compax and Syndite are susceptible to thermal damage if exposed to temperatures in excess of about 700° C. (As used herein self-bonded means that the abrasive particles are directly bonded one to another.) This damage is thought to result from a differential in the thermal expansion rate of the abrasive and metal phases. At elevated temperatures there is also a risk of degradation to the particles themselves as by graphitization or oxidation. This type of degradation is thought to be of concern for all types of abrasive particle compacts. Accordingly, braze alloys with liquidus temperatures of less than 700° C. were utilized initially for attachment of composite compacts to studs or substrates. Unfortunately, such low temperature braze alloys found only limited applicability in the marketplace due to their characteristically low bond strengths.

A major breakthrough in the attachment of composite compacts to substrates was made by Knemeyer in U.S. Pat. Nos. 4,225,322 and 4,319,707. The Knemeyer process permits the use of high temperature braze alloys for attaching a composite compact to a substate. Such high temperature braze alloys, in turn, provide significantly greater bond strengths. While the Knemeyer method and apparatus permit the use of high temperature braze alloys, difficulty has arisen in the selection of a suitable one. For example, Anaconda 773 filler metal, initially proposed in the Knemeyer patents, is now thought to be undesirably reactive with the carbide pieces being joined.

Complicating the braze material selection is the fact that the braze must not only be suitable for joining a composite compact support to a substrate, but it must also be capable of withstanding subsequent manufacturing and operating conditions. For example, a common manufacturing method includes first tinning the brazed implement and then furnace brazing the pre-tinned implement to recesses cut in a drill crown in the manner of U.S. Pat. No. 4,156,329 (cited above). Braze joints made using prior braze materials have had difficulty in withstanding such tinning and furnace brazing operations. Bond strength during these operations is especially critical since the bond is believed to be under tensile strain following the initial brazing procedure. Finally, to function in typical drilling environments it is thought that the braze joint must be designed to be capable of withstanding temperatures of up to about 400° C. in an oxidizing atmosphere while being subjected to continuous impact loading as would be the case if heterogeneous formations were encountered.

BROAD STATEMENT OF THE INVENTION

The present invention is directed to an implement which comprises a composite compact which is brazed to a substrate with a brazing filler metal which has a liquidus substantially above 700° C. The improved component of the implement comprises a brazing filler metal which is an alloy having a composition in the following range, by weight:

|    | Broad Range | Preferred Range |
|----|-------------|-----------------|
| Pd | 20–80%      | 28–32%          |
| Cr | 2–13%       | 6–13%           |
| B  | 1–4%        | 1–3.5%          |
| Ni | balance     | balance         |

The method of joining the support of a composite compact to a substrate with the foregoing brazing alloy is another aspect of the present invention. Advantageously, the compact is selected from polycrystalline cubic boron nitride and diamond composite compacts. The support and substrate advantageously are comprised of a material selected from the group consisting of cemented tungsten carbide, titanium carbide, tungsten-molybdenum carbide, and tantalum carbide wherein the metal bond material for the carbide is selected from the group consisting of cobalt, nickel, iron and mixtures thereof, an elemental metal which forms a stable nitride or boride, and a metal alloy which forms a stable nitride or boride. Preferably, both the substrate and the support are of the same type of carbide material, although not necessarily the same grade.

Advantages of the present invention include the formation of an alloy bond which possesses improved strength. Another advantage is an alloy bond which is stable to later application of heat, for example, by tinning, furnace brazing, operating conditions and combinations thereof. A further advantage is a much improved degree of reliability and reproduceability of the alloy bond. These and other advantages will be readily apparent to those skilled in the art based upon the disclosure contained herein.

BRIEF DESCRIPTION OF THE DRAWINGS

FIG. 3 is a schematic diagram of a test fixture which has been modified for testing as described in Example 1.

The drawings will be described in detail in connection with the following description.

DETAILED DESCRIPTION OF THE INVENTION

Figure 1:
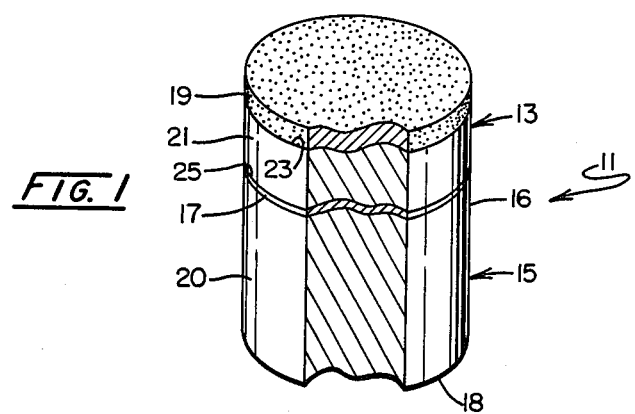
FIG. 1 is a fragmentary perspective view of a component in accordance with the features of this invention.

FIG. 1 shows an implement 11 in accordance with an embodiment of the invention. The implement 11 is comprised of a composite compact 13, a stud or substrate 15, and a thin continuous layer 17 of filler metal (shown disproportionately larger for purposes of illustration) disposed between and bonding the substrate 15 to the compact 13 along an interface 16. The component configuration may be varied to suit the particular application, e.g. the interface 16 may be angled relative to the main body of the substrate 15.

The composite compact 13 is comprised of a polycrystalline particulate mass or layer 19 of bonded abrasive particles and a support or base layer 21 preferably of cemented carbide bonded to the compact 19 along an interface 23. The bonded abrasive particles of the compact 19 may be diamond and/or cubic boron nitride. The carbide support 21 also is provided with oppositely disposed surface 25. In a preferred embodiment, layer 19 of the compact 13 is comprised by volume of at least 70% diamond and preferably in excess of 90% diamond in a diamond-to-diamond self-bonded state as explained in detail in U.S. Pat. No. 3,745,623. The remaining 30% or less primarily is comprised of the bonding material, preferably cobalt (or alloys), of the cemented carbide mass 21 which is infiltrated into layer 19 as a second phase to the diamond first phase during a high temperature//high pressure fabrication process. In an alternative embodiment, the compact 13 may be comprised of a hard phase boron nitride layer 19 constructed in accordance with U.S. Pat. Nos. 3,743,489 or 3,767,371. Though only cubic boron nitride is disclosed in these references, the hard hexagonal form may be substituted in whole or in part for the cubic form.

The substrate 15 preferably is comprised of cemented carbide and preferably is of the same type of carbide as the support 21. Cemented tungsten carbide is preferable, particularly in drill bit applications, because of its hardness and impact resistance. The filler metal 17 is a high temperature, high strength brazing filler metal having a liquidus greater than 700° C. This temperature is generally recognized to be a threshold degradation temperature of self-bonded diamond and boron nitride composite compacts which have a second metal phase in the abrasive layer 19. The high strength brazing alloy of the present invention has the following nominal composition by weight:

Pd: 28–32%
Cr: 6–13%
B: 1–3.5%
Ni: balance

The brazing alloy is described and claimed in U.S. Pat. No. 4,414,178, the disclosure of which is incorporated expressly herein by reference. This alloy is described in this reference as capable of brazing in the 1800°–2000° F. (982°–1093° C.) temperature range. The U.S. Pat. No. 4,414,178 teaches that the brazing alloy is useful in fabricating aircraft gas turbine components, but does not suggest the brazing alloy for bonding metal carbides, much less for bonding a supported composite polycrystalline compact to a substrate as disclosed herein. A useful brazing alloy evaluated in the Examples has the following nominal composition, by weight:

Ni: 58.7%
Pd: 30%
Cr: 8.3%
B: 3%

This particular brazing alloy composition unexpectedly provides excellent bonds between the two carbide pieces being joined and remains useful after being subjected to normal manufacturing procedures and during use. The alloy spreads evenly in the joint and has not been seen to interact undesirably with the cemented tungsten carbide support or substrates tested thus far, or any components thereof. Moreover, this brazing alloy provides a degree of reliability and reproduceability which has not been achieved by use of prior proposed filler metals.

As mentioned, Anaconda 773 filler metal (Cu 50%, Zn 40%, Ni 10%, melting point range 950°–960° C.), noted in U.S. Pat. Nos. 4,225,322 and 4,319,707, is now thought to be undesirably reactive with the carbide pieces being joined and additionally does not provide adequate bond strength at higher temperatures of use contemplated for the composite compact components. Another previously proposed brazing filler metal is BAg-1 (ASW-ASTM classification) which is a low temperature brazing filler metal that provides braze bond strengths even below those provided by Anaconda 773 filler metal. Another brazing filler metal which has been proposed is TiCuSil (Ti 4.5%, Cu 26.7%, Ag balance, melting point range 840°–850° C.). However, TiCusil does not braze well unless brazing is conducted under vacuum or an inert atmosphere.

In contrast, the brazing alloy for use in the present invention has not exhibited these shortcomings and also provides an initial excellent bond strength at ambient temperature. Moreover, such bond strength is substantially maintained over high temperatures of manufacture and use required of the composite compact components. The bond strength, as determined by shear strength measurements, is especially good in comparison to other alloys tested at potential end use operating temperatures of about 200°–400° C. and even up to at least about 600° C. This again is in contrast with prior brazing filler metals which may have provided initial ambient temperature bond strength, but did not maintain their strength to the same degree as the alloy of the present invention as elevated temperature ranges are encountered during reheating in manufacturing or in operation.

Another unexpected advantage in using the brazing alloy disclosed herein is the reproducibility of the bond strength described above. Testing thus-far has indicated that essentially no composite compact components brazed with the disclosed alloy composition need be rejected for failing to meet design specifications of bond strength. The excellent bond strength and reliability which the brazing alloy provides in this application was also unexpected for a brazing alloy composition which has such a complex mixture of ingredients. The examples will demonstrate the usefulness of the brazing alloy.

In implementing the present invention, the braze alloy is heated above its solidus temperature. As noted above, this of course is in excess of the generally recognized degradation temperature of 700° C. for self-bonded, second phase metal infiltrated composite compacts typically employed in current drill bit applications. Even in the case of more thermally stable compacts, such as described in U.S. Pat. Nos. 4,288,248 and 4,151,686, it is thought that unnecessarily elevated abrasive particle temperatures in the layer 19 should be avoided. Accordingly, it is recommended that a method and apparatus such as described in U.S. Pat. Nos. 4,225,322 and 4,319,707 be employed in practicing this invention.

Figure 2:
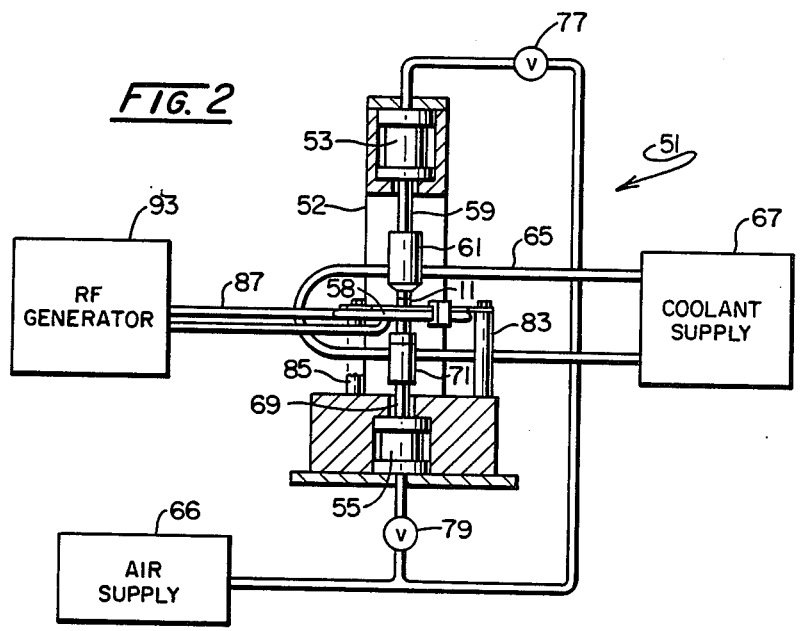
FIG. 2 is a schematic diagram of an apparatus for fabricating a component in accordance with the present invention.

Referring to the apparatus of U.S. Pat. No. 4,319,707 as depicted in FIG. 2, an apparatus 51 for fabricating a component 11 is comprised of a frame member 52 to which is fixed a pair of pneumatic cylinders shown at 53 and 55 for holding, relative to an induction coil assembly 58, a component 11 for brazing. The pneumatic cylinder 53 comprises a plunger 59 with a head 61 for receiving one end of the composite compact 13. The head 61 may be recessed to help align the compact 13 to the substrate 15. Alternatively, it may be non-recessed and another means such as a ceramic sleeve (not shown) can be used to maintain proper part alignment before brazing. The head 61 also is provided with a coolant, preferably water, via a tube 65 from a coolant supply 67 of conventional construction. The head 61 and coolant supply 67 together function as a heat sink for the diamond layer or table 19 during the brazing of a compact 13 to a substrate 15. Preferably, a deformable heat conductive material, such as a copper disc, is placed between the diamond layer 19 of the compact 13 and the head 61 to improve thermal conductivity from the layer 19 to head 61.

The pneumatic cylinder 55 similarly is comprised of a plunger 69 with a head 71 fixed at one end thereof. A cup-shaped ceramic insulator 78 is positioned on the head 71 for supporting one end 18 of a substrate 15 for preventing the heat sinking of the substrate to the head 71 during brazing operations. The head 71 also is interconnected to the coolant supply 67 via tube 65.

The pneumatic cylinders 53 and 55 are supplied with air under pressure from an air supply 66 through control valves 77 and 79, respectively. When extended, the plungers 59 and 69 position a component 11 coaxially of the induction assembly coil 58 which is supported on the frame 52 by supports 83 and 85. A third support for the assembly 58 is not shown in the drawings. Also not shown in the drawings is the coil assembly construction. The coil 85 is interconnected by RF generator 93 for power. For details of such coil assembly construction, reference is made to U.S. Pat. Nos. 4,225,322 and 4,319,707. It should be noted that the temperature of the diamond layer 19 may be monitored during brazing operations, if desired, by conventional tactile and non-tactile means in conventional fashion. Thus, the use of thermocouples, fiber optics, and other sensors may be employed as a precaution in order to assure that the coolant supply is operating properly for preventing the temperature of the diamond layer 19 from exceeding a critical threshold temperture at which thermal damage occurs. Such monitoring may be accomplished, for example, by drilling a hole through the vertical center of the head 61 so that a sensing contact with the diamond layer 19 can be established for monitoring its temperature. In this regard, it has been found that the self-bonded, second phase-infiltrated diamond layer 19 described above of compacts typically used in drilling applications apparently can withstand short temperature excursions (bursts) above 700° C. as indicated in the following examples without any apparent signs of thermal damage which would otherwise occur with normal heating above 700° C.

The following examples show how the present invention can be practiced but should not be construed as limiting. In this application, all percentages and parts are by weight and all units are in the metric system, unless otherwise expressly indicated. Also, all references cited herein are incorporated herein expressly by reference.

EXAMPLE 1

Ten self-bonded, metal-infiltrated polycrystalline diamond compacts having cobalt-cemented tungsten carbide support layers (Product 2530-NC Stratapax Drill Blank, General Electric Company, Worthington, Ohio) were bonded to right cylindrical 13.4 mm Carboloy grade 55 B cobalt-cemented tungsten carbide substrates in accordance with the method and apparatus disclosed in U.S. Pat. Nos. 4,225,322 and 4,319,707 with the following exceptions. First, the bonding alloy employed was analyzed and determined to have the following composition (wt-%):

Ni: 58.64±0.7%
Pd: 30.04±0.1%
Cr: 8.26±0.7%
B: Balance

Thus, this brazing alloy is covered in U.S. Pat. No. 4,414,178. Second, a copper disc was used to conduct heat between the diamond layer 19 and the head 61. Finally, the temperature of the diamond layer 19 was monitored as noted above.

The bonding was performed by heating the interface region between the support and substrate for approximately 11 seconds. Power to the heat induction coil was adjusted such that an estimated diamond table peak temperature of about 840° C. was achieved. Five of the samples were randomly selected and subjected to shear strength measurements employing a conventional load testing machine using a modified test fixture. More specifically, the machine was conventional in construction except for the non-collet fixture identified generally in FIG. 3 at 101 and composed of an upper portion 103 and an identical lower portion 105. Areas 107 and 109 are void areas to reduce heat loss out of the ends of fixture portions 103 and 105, respectively. An induction coil assembly 115 circumscribes fixture portions 103 an 105 and enables the heating of a sample ipmlement 111 during the application of force for shear testing. The sample implement 111 is retained within recesses formed within the upper and lower fixture portions 103 and 105 as shown in FIG. 3. Additionally, each recess has an opening therefrom extending to the outside for insertion of a thermocouple 113 which is used to sense the diamond table temperature obtained during the shear force testing. This fixture design was made necessary because the standard collet fixture for the machine did not permit the induction coil assembly 115 to be utilized during the shear testing procedure.

An as-bonded group of five implements was tested first. Next, the remaining 5 samples of the bonded implements were heated to simulate furnace-brazing. Furnace-brazing in this example comprehended a linear ramp heating of the components from room temperature to 700° C. for over approximately 1 hour after which the component is maintained at 700° C. for about 15 minutes. As noted above, furnace-brazing is a conventional method for attaching the components to drill crowns. The bonds formed by the brazing alloy must be able to withstand such conventional furnace-brazing conditions since they are often employed in use. The following table records the samples and their preparation conditions.

TABLE 1

| Sample No. | Max-Diamond Temp.(°C.) | Heating Time (sec) | Furnace Brazed |
|---|---|---|---|
| 1 | 855 | 11.0 | — |
| 2 | 850 | 10.5 | yes |
| 3 | 854 | 13.2 | yes |
| 4 | 858 | 12.8 | — |
| 5 | 861 | 11.8 | — |
| 6 | 853 | 10.7 | yes |
| 7 | 855 | 11.8 | yes |
| 8 | 854 | 10.6 | — |
| 9 | 859 | 11.2 | — |
| 10 | 855 | 10.3 | yes |

All ten of the samples passed the shear strength test at the maximum test load of 57 kn/cm² (i.e. none of the samples failed). Generally, bond strengths of greater than about 35 kn/cm² are thought to be desirable in order for the bond strength to be clearly sufficient for use in drill bit and other applications. These results clearly show that the bond strength of the braze alloy of the present invention exceeds the bond strength minimum. Of special interest is the fact that the bond strength was maintained even after the elevated temperature furnace brazing cycle. Bond strength was maintained despite the fact that such bonds are generally under a tensile load after the initial brazing, which load is thought to contribute towards the relatively high failure rate after such post-braze processing using prior art brazing materials.

EXAMPLE 2

Sample 8 of Example 1 was subjected to shear strength measurements at elevated temperatures which would be expected to be encountered during drilling and other operations utilizing such brazed implements. The first cycle was conducted at about 592° C. and Sample 8 did not fail at the maximum test load of 32.26 kn/cm². Sample 8 thereafter was subjected to a second cycle at about 604° C. and failed at about 32.24 kn/cm².

Sample 7, which had been furnace brazed, also was subjected to shear strength measurements at about 600° C. Sample 7 passed the test to 32.26 kn/cm². The furnace brazing operation had no apparent affect on this sample.

Excellent bond strengths at elevated temperature are demonstrated by these results. Also demonstrated is the tolerance to furnace brazing which the braze alloy of the present invention possesses.

Although the brazed implement of the present invention has been described in connection with specific examples and embodiments, it will be understood by those skilled in the art the variations and modifications of which this invention is capable without departing from its broad scope.

What is claimed is:

1. A brazed implement comprising a composite compact having an abrasive particle layer bonded to a cemented carbide support and a cemented carbide sustrate bonded to said support by a brazing filler metal disposed therebetween which brazing metal is an alloy having a liquidus substantially above 700° C. and having the following composition, by weight:
   Pd: 20–80%
   Cr: 2–13%
   B: 1–4%
   Ni: balance.

2. The brazed implement of claim 1 wherein said alloy has the following nominal composition by weight:
   Pd: 28–32%
   Cr: 6–13%
   B: 1–3.5%
   Ni: balance.

3. The brazed implement of claim 1 wherein said alloy has the following nominal composition, by weight:
   Ni: 58.7%
   Pd: 30%
   Cr: 8.3%
   B: 3%.

4. The brazed implement of claim 1 wherein both said support and said substrate are metal bonded carbide selected from the group consisting of tungsten carbide, titanum carbide, tungsten-molybdenum carbode, and tantalum carbide, wherein the metal providing the metal bond is selected from the group consisting of cobalt, nickel, iron, and mixtures thereof.

5. The brazed implement of claim 1 wherein both said support and said substrate are cobalt-cemented tungsten carbide.

6. The brazed implement of claim 1 wherein said abrasive particle layer comprises a self-bonded polycrystalline diamond compact having an infiltrated metal second phase.

7. The brazed implement of claim 6 wherein said second phase comprises cobalt.

8. The brazed implement of claim 1 wherein said abrasive particle layer comprises a self-bonded polycrystalline cubic boron nitride compact having an infiltrated metal second phase.

9. In a method for fabricating a brazed metal implement comprised of a cemented carbide-supported composite compact having a layer of self-bonded abrasive particles infiltrated with a metal second phase, the support of said compact being bonded to a cemented carbide substrate by a brazing filler metal having a liquidus substantially above 700° C. and above the thermal degradation temperature of said compact, which method comprises brazing said compact support to said substrate while disposing the abrasive particle layer in thermal contact with a heat sink, the improvement which comprises using a brazing alloy which has the following composition by weight:
Pd: 20-80%
Cr: 2-13%
B: 1-4%
Ni: balance.

10. The improved method of claim 9 wherein said support is brazed to said substrate with a brazing alloy having the following nominal composition, by weight:
Pd: 28-32%
Cr: 6-13%
B: 1-3.5%
Ni: balance.

11. The improved method of claim 9 wherein said support is brazed to said substrate with a brazing alloy having the following nominal composition, by weight:
Ni: 58.7%
Pd: 30%
Cr: 8.3%
B: 3%.

12. The improved method of claim 9 wherein said cemented carbide support and said cemented carbide substrate are both metal bonded carbides selected from the group consisting of tungsten carbide, titanium carbide, tungsten molybdenum carbide and tantalum carbide, wherein the metal providing the metal bond is selected from the group consisting of cobalt, nickel, iron, and mixtures thereof.

13. The improved method of claim 9 wherein said abrasive particle layer of said composite compact comprises a metal-infiltrated, self-bonded polycrystalline diamond compact.

14. The improved method of claim 9 wherein the abrasive particle layer of said composite compact comprises a metal-infiltrated, self-bonded polycrystalline cubic boron nitride compact.

* * * * *